(12) United States Patent
Winningstad et al.

(10) Patent No.: US 7,894,519 B2
(45) Date of Patent: *Feb. 22, 2011

(54) WIRELESS EVENT AUTHENTICATION SYSTEM

(75) Inventors: C. Norman Winningstad, Newport, OR (US); Micheal D. Brown, Sherwood, OR (US)

(73) Assignee: Moderator Systems, Inc., South Beach, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/360,051

(22) Filed: Jan. 26, 2009

(65) Prior Publication Data

US 2009/0174779 A1    Jul. 9, 2009

Related U.S. Application Data (63) Continuation of application No. 11/149,860, filed on Jun. 10, 2005, now Pat. No. 7,496,140, and a continuation-in-part of application No. 11/111,300, filed on Apr. 20, 2005, now Pat. No. 7,483,485.

(60) Provisional application No. 60/646,712, filed on Jan. 24, 2005.

(51) Int. Cl.
    *H04B 1/66* (2006.01)

(52) U.S. Cl. .................. 375/240.01; 348/143; 348/158; 348/148; 348/552; 386/124; 386/117; 386/96; 386/46; 709/224; 709/218; 709/249; 709/250; 707/9

(58) Field of Classification Search ............ 375/240.01; 348/143, 158, 148, 552; 386/124, 117, 96, 386/46; 707/9; 709/224, 218, 249, 250
    See application file for complete search history.

(56) References Cited

U.S. PATENT DOCUMENTS

| 3,542,457 A | 11/1970 | Balding |
| 4,051,534 A | 9/1977 | Dukich et al. |
| 4,398,799 A | 8/1983 | Swift |
| 4,425,586 A | 1/1984 | Miller |

(Continued)

FOREIGN PATENT DOCUMENTS

JP    2000-333160    11/2000

(Continued)

OTHER PUBLICATIONS

Messner, RA, et al., "Mobile Digital Video System for Law Enforcement", IEEE, 2002, pp. 468-472, vol. 1, Vehicular Technology Conference, May 6, 2002, New York, NY, IEEE, US.

(Continued)

*Primary Examiner*—Shawn An
(74) *Attorney, Agent, or Firm*—Marger Johnson & McCollom, P.C.

(57) ABSTRACT

A wireless data acquisition and recording (DAR) system includes acquisition circuitry including a video camera and/or a microphone carried by an operator for capturing video and audio events viewed and/or heard by the operator. A wireless transmitter wirelessly transmits digital signals containing the video events captured by the video camera and the audio events detected by the microphone. A data display and report submission (DD) device receives the wirelessly transmitted digital data captured by the acquisition circuitry and stores the data as media files.

20 Claims, 6 Drawing Sheets

U.S. PATENT DOCUMENTS

| | | |
|---|---|---|
| 4,516,157 A | 5/1985 | Campbell |
| 4,797,736 A | 1/1989 | Kloots |
| 5,091,719 A | 2/1992 | Beamon, III |
| 5,189,512 A | 2/1993 | Cameron |
| 5,793,419 A | 8/1998 | Fraley |
| 5,886,739 A | 3/1999 | Winningstad |
| 6,563,532 B1 * | 5/2003 | Strub et al. .................. 348/158 |
| 6,988,144 B1 * | 1/2006 | Luken et al. ................. 709/231 |
| 7,126,626 B2 | 10/2006 | Sawahara et al. |
| 7,266,150 B2 * | 9/2007 | Demos .................. 375/240.15 |
| 7,456,875 B2 | 11/2008 | Kashiwa |
| 7,483,485 B2 * | 1/2009 | Winningstad et al. .. 375/240.01 |
| 7,496,140 B2 * | 2/2009 | Winningstad et al. .. 375/240.01 |
| 2002/0008625 A1 | 1/2002 | Adams et al. |
| 2003/0081935 A1* | 5/2003 | Kirmuss ...................... 386/46 |
| 2003/0086000 A1 | 5/2003 | Siemens et al. |
| 2003/0095688 A1 | 5/2003 | Kirmuss |
| 2004/0015467 A1 * | 1/2004 | Fano ............................. 707/1 |
| 2004/0091111 A1* | 5/2004 | Levy et al. .................. 380/202 |

FOREIGN PATENT DOCUMENTS

| | | |
|---|---|---|
| JP | 2001-078070 | 3/2001 |
| JP | 2002-300570 | 10/2002 |
| JP | 2002-366565 | 12/2002 |
| JP | 2003-274359 | 9/2003 |
| JP | 2004-013871 | 1/2004 |
| JP | 2004-274304 | 9/2004 |
| WO | 0223826 A2 | 3/2002 |
| WO | WO03/021907 | 3/2003 |
| WO | WO 03/021907 A1 * | 3/2007 |

OTHER PUBLICATIONS

European Patent Office Search Report dated Mar. 23, 2010, Berlin, Germany.

Notice of Refusal dated Jul. 27, 2010 corresponding to Japanese Patent Application No. 2007-552159.

* cited by examiner

WIRELESS EVENT AUTHENTICATION SYSTEM

CROSS REFERENCE TO RELATED APPLICATIONS

This application is a continuation of U.S. patent application Ser. No. 11/149,860 filed on Jun. 10, 2005 now U.S. Pat. No. 7,496,140 and a continuation-in-part of U.S. patent application Ser. No. 11/111,300, filed Apr. 20, 2005 now U.S. Pat. No. 7,483,485, which claims the benefit of U.S. Provisional Patent Application Ser. No. 60/646,712, filed Jan. 24, 2005.

This invention relates generally to audio and video recording equipment and more particularly to a wireless portable video and audio recording system that automatically tracks and records objects and events viewed by an operator.

There is a need to record police investigations and incidences, insurance claim investigations, medical emergencies, and other day-to-day events that may occur during work or other activities. For example, it may be desirable for a police officer to record events after a car is pulled over or record events while searching a building for criminal activity. These recorded events can then be used as evidence in future litigation or procedural matters.

For example, the recorded real-time arrest of a criminal suspect can be used as evidence at trial that the suspect was properly read their Miranda rights. In the insurance investigation example, an insurance company representative can record observations while investigating the extent of property damage at the site of an insurance claim.

The problem with recording events is that it requires the police officer, insurance adjuster, or other operator, to operate the recording equipment in additional to performing their regular duties. For example, it would be difficult for a police officer to operate a video camera while at the same time frisking a criminal suspect. In the insurance investigation example, is would be difficult for the insurance adjuster to operate a video camera and write down notes at the same time.

Portable video and audio recording systems have been suggested in the past that attach a camera to the head of an operator and then strap other recording equipment and power supplies onto the operator. The problem with these systems is that they require a substantial amount of wiring for connecting together the camera, video and audio recording equipment, and portable power supply. These systems make it awkward for the operator to freely move around during their normal job tasks.

There are also no systems currently available for efficiently storing, transporting, and managing the large amount of recorded information that may be generated during one or more recorded events. For example, there are no systems that efficiently track and organize the recorded video and audio information. Authentication and security is also a problem. For example, in some applications, the recorded material may not be useful unless the time and location of the recording is authenticated, and means for preventing unauthorized use may be needed in some applications.

The present invention addresses this and other problems associated with the prior art.

SUMMARY OF THE INVENTION

A wireless data acquisition and recording (DAR) system includes acquisition circuitry including a video camera and/or a microphone carried by an operator for capturing video and audio events viewed and/or heard by the operator. A wireless transmitter wirelessly transmits digital signals containing the video events captured by the video camera and the audio events detected by the microphone. A data display and report submission (DD) device receives the wirelessly transmitted digital data captured by the acquisition circuitry and stores the data as media files.

The foregoing and other objects, features and advantages of the invention will become more readily apparent from the following detailed description of a preferred embodiment of the invention which proceeds with reference to the accompanying drawings.

DETAILED DESCRIPTION

A wireless data acquisition and recording (DAR) system takes advantage of newly-developed wireless transmission systems, originally intended for wireless web communications, to send data from miniature sensors (MS) to a miniaturized personal computer (MPC) equipment. The DAR system allows simultaneous storage of captured video and audio signals and also allows the entry of an operator report related to the recorded data. This greatly simplifies operator tasks and saves time.

The DAR system can also record the date and time of operator recordings thus reducing the possibility of falsifying the date, time, and sequence of recorded events. Passwords and the authentication keys can also be used to improve the security and integrity of the recorded data.

The DAR system can also transmit data real-time to a specialized relay station for re-transmission to a central head quarters (HQ). This allows support personnel at the HQ to provide near real-time support to the operator. The relay station can also automatically download recorded data from the operator's miniaturized personal computer, freeing up memory for recording new events while at the same time preserving the previously recorded data.

Figure 1:
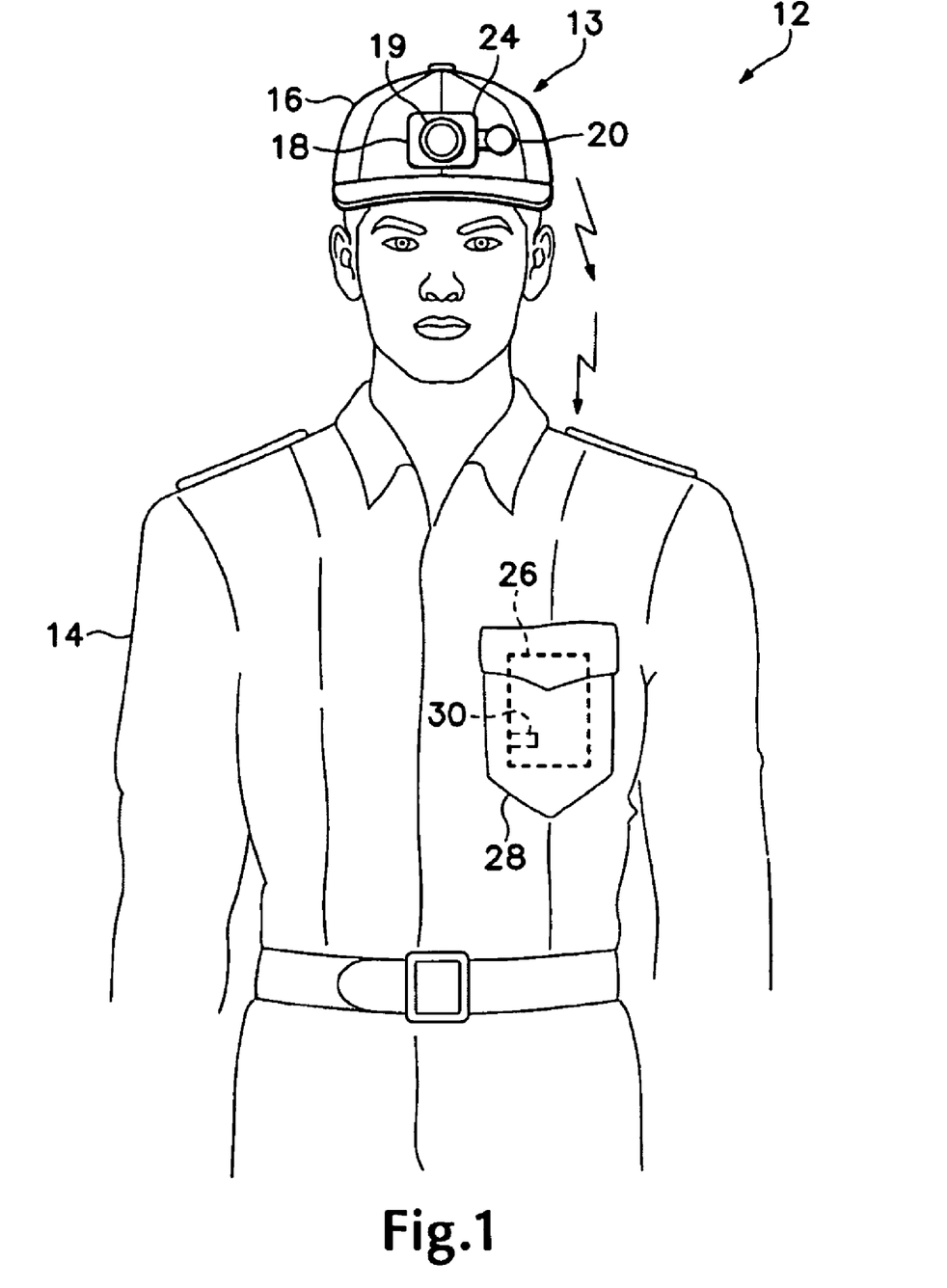
FIG. 1 shows a wireless data acquisition and recording (DAR) system.

FIG. 1 shows the wireless data acquisition and recording (DAR) system 12 carried by an operator 14. The DSR system 12 includes acquisition circuitry 13 that wirelessly sends captured video and audio data to a data display and report submission (DD) device 26. The acquisition circuitry 13 includes a miniaturized video camera 18 that contains automatic exposure capability, as well as a digital output. A lens 19 in the camera 18 can be chosen according to the operator requirements. However, typically a wide-angle lens 19 is provided for general purpose use. A miniaturized microphone 20 contains automatic volume control capability and has a digital output. The miniaturized video camera 18 and microphone 20 can come with (or without) an Motion Picture Experts Group (MPEG) encoder, but is equipped with a transmitter/receiver (transceiver), allowing wireless remote operation. The acquisition circuitry 13 is self-powered, typically by means of a battery (not shown).

An audio output from microphone 20 along with a video output from the video camera 18 are both digitized and wirelessly transmitted to the DD device 26. In this example the DD device is carried in a pocket 28 of the operator, but can be carried anywhere on the operator that is convenient. The DD device 26 in one embodiment is a commercially available miniaturized computer unit, that can be custom-configured to operator requirements. For example, the DD device 26 may be a slightly customized Personal Digital Assistant (PDA) or a Pocket PC.

Images and audio signals wirelessly received by DD device 26 are digitally stored into a memory device, such as a Flash memory. Removable memory storage devices, such as Flash memory sticks, can be used and replaced when a currently installed memory stick becomes full. The DD device 26 typically operates using alkaline batteries or a rechargeable battery.

A switch 30 on the DD device 28 can be used to manually activate the DAR system 12. Alternatively, the DAR system 12 can be voice or sound activated when the operator 14 utters a key word that then triggers a voice recognition system or makes some type of noise that activates a sound activation system in the DD device 26. The DD device 28 after detecting the manual or audio activation signal then sends a wireless activation signal activating acquisition circuitry 13. The activation system can also be located in the acquisition circuitry 13.

In the implementation shown in FIG. 1, the acquisition circuitry 13 is attached to a hat 16 so that the video camera 18 captures images within the viewing range of the operator 14. For example, when operator 14 turns his head, video camera 18 moves in the same direction automatically recording events within the viewing direction of the operator 14. In addition, because the acquisition circuitry 13 is also located on hat 16 near the ear of operator 14, sounds audible to the operator 14 are also recorded by the microphone 20. Therefore, if operator 14 moves closer to hear sounds, such as bending over to hear someone whispering, microphone 20 is also moved closer to the source of the sound, thus, increasing the chances of clearly recording the same audio signals heard by the operator. The acquisition circuitry 13 can be attached equally as well to a helmet, headband, or any alternate headgear.

An activation indicator (not shown), such as a light emitting diode (LED) may be illuminated on the acquisition circuitry 13 when the DAR system 12 is activated. The LED can be used to inform people that they are presently being video and audio recorded. The LED can also be used with a separately controllable switch to illuminate in different situations. Depending on the application, it may be advantageous to notify someone that their actions and utterances are being recorded. For example, if the DAR system 12 is being used by police officers, the suspect may require notification before being recorded. Activating the LED provides notification to a suspect that the recording is taking place.

The wireless signal transmission between the acquisition circuitry 13 and the DD device 26 provides the operator 14 with increased freedom of motion. For example, the operator 14 can move their head at any angle and not disrupt the capture and downloading of image and audio data from the acquisition circuitry 13 to the DD device 26. The wireless DAR system 12 also allows the operator 14 to perform any normal activity such as lifting, sitting, or running without disrupting the capture and storing operations.

The various components of the DAR system 12 can easily attach and detach onto other pieces of the operators clothing. For example, the video camera 18 and microphone 20 can attach to a jacket or to epaulets of a jacket or shirt with VELCRO or alternative attachment means such as straps or clips. The DD device 26 can also alternatively be attached on a belt or carried in another pocket of the operator 14.

Figure 2:
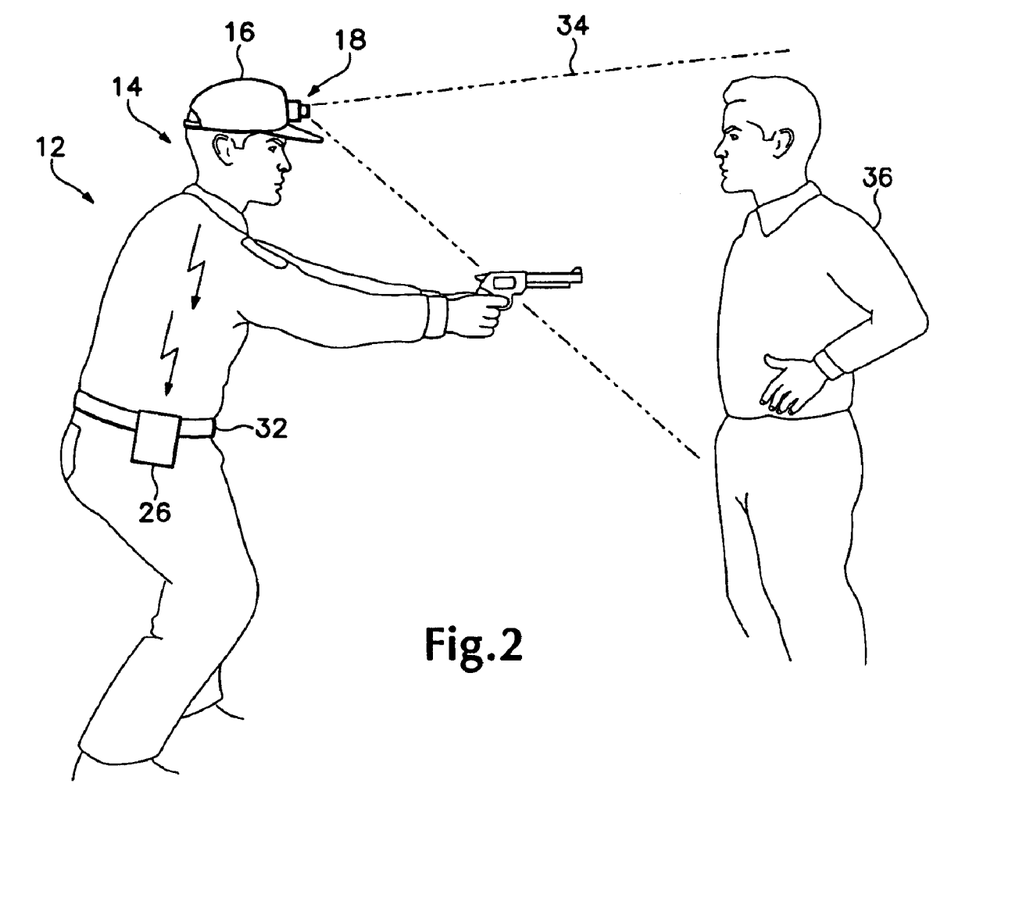
FIG. 2 shows the DAR system used during an arrest.

FIG. 2 shows the DAR system 12 of FIG. 1 carried by a police officer or security guard 14. In this example, the DD device 26 is attached to the belt 32 of operator 14. The police officer 14 activates the DAR system 12 while on patrol, thereby, automatically recording anyone that comes into video sensing area 34. The camera 18 has a wide angle lens 19 (FIG. 1) that detects most if not all of a suspect 36. For example, the police officer 14 may activate the DAR system 12 to record events surrounding a routine vehicle stop of a suspected drunk driver.

Since the camera 18 is directed out the front of the operator's hat 16, the video camera 18 automatically tracks suspect 36 while being confronted by police officer 14. For example, suspect 36 may move to either side of police officer 14. To maintain visual contact, police officer 14 naturally moves his head in the direction of the suspect 36. Accordingly, the camera 18 tracks the head movements of police officer 14 maintaining a constant surveillance on suspect 36. Thus, the DAR system 12 records the activities of suspect 36 while the hands of officer 14 are free to perform other tasks, such as drawing a gun.

If wearing a hat or helmet is undesirable, the acquisition circuitry 13 can alternatively be worn on a shoulder, lapel, or elsewhere, such as on an object separate from the operator 14. In any case, the acquisition circuitry 13 is typically mounted vertically, to both keep the video horizon proper and also to provide the proper antenna orientation.

The DD device 26 can be worn in a shirt pocket 28 or in a pant pocket of operator 14, but can also be worn in any other convenient place on the operator 14 such as in a vest or other carrying device. As long as the operator 14 remains close, the DD device 26 can be placed on an object that is detached from the operator 14. For best range of reception, the DD device 26 should also be vertically arranged.

Since the components in the DAR system 12 are light weight and communicate wirelessly, they can be distributed anywhere on the police officer 14 and can be carried for an entire shift without significant fatigue. Also, because the separate components of the DAR system 12 can be attached on the belt 32 or on the front of jacket, the police officer 14 can drive a squad car while the DAR system 12 is still attached and operating. Operators, such as emergency medical personnel, can also continuously operate the DAR system 12 even while sitting in an emergency vehicle.

The wireless DAR system 12 has other advantages over other wired video systems. For example, if a wired video recording system were installed on a police officer, the wires connecting the camera to the recorder could be used by a criminal to possibly strangle the operator. Since the DAR system 12 does not require wires, the system is safer for certain applications such as for police work.

Of course the DAR system 12 can be used for any number of other applications. For example, the DAR system 12 can be worn by insurance adjusters that need to record a home or car accident. In another application, the DAR system 12 can be worn by emergency medical personnel who need to record emergency care events to confirm proper medical procedures are taken. A critically ill patient can be recorded by the DAR system 12 and then transmitted back to a hospital. A medical doctor at the hospital can then relay medical advice back to the operator 14 on DD device 26.

Relaying Content

Figure 3:
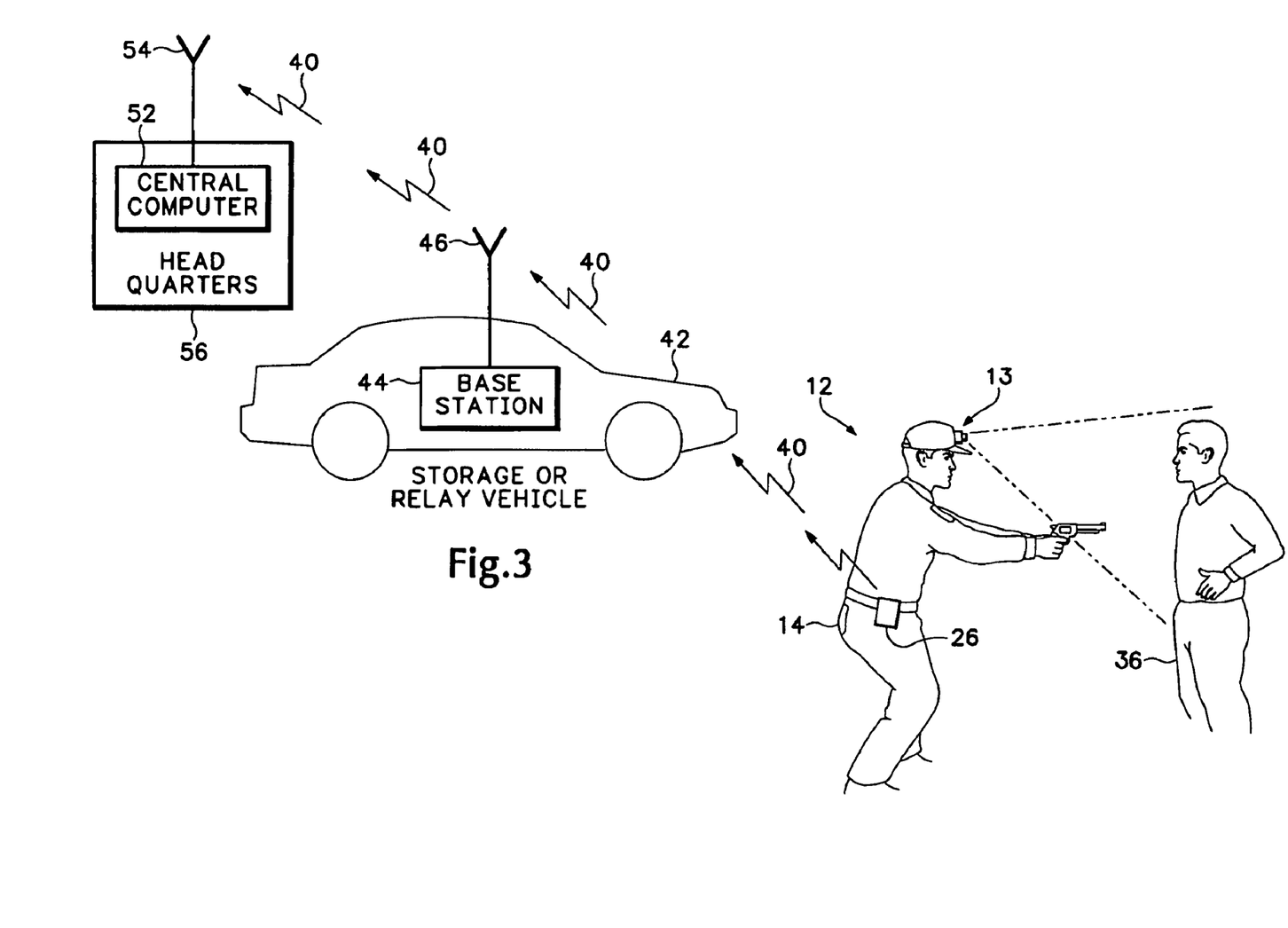
FIG. 3 shows a base station and central computer used in conjunction with the DAR system.

Referring to FIG. 3, the DAR system 12 may send information to other data recording stations for further analysis and storage. For example, the video and/or audio data captured by the acquisition circuitry 13 and stored in the DD device 26 may be wirelessly relayed to a base station or relay station 44 that in this example is located in an operator vehicle 42. The operator 14 might typically work within relatively close proximity to vehicle 42 or come within close proximity of car 42 periodically during a typical work shift. This allows the DD device 26 to wireless download video and audio information 40 to the base station 44. Access to a large power supply, such as a car battery, allows the base station 44 to operate as a repeater or transmitter/receiver for relaying the video and audio information 40 to a central computer 52 at a headquarter location 56.

In addition, the DD device 26 may be preprogrammed to download stored information to base station 44 whenever it is within wireless transmission range. This prevents the DD device 26 from being overloaded with data and allows the base station 44 to automatically save all of the audio and video information obtained by DAR system 12. Different DAR systems 12 coming within wireless transmission range of base station 44 may all automatically download stored information. The base station 44 can also include a docketing station that the DD device 26 seats into for battery recharging and data downloading when the operator 14 is driving vehicle 42.

The central computer 52 operating at headquarters location 56 is equipped with a receiver and transmitter that receive the relayed video and audio signals 40 from base station 44 or receive video and audio signals 40 directly from the DD device 26. Headquarters 56 can be any office or home location of the operator 14 including a police headquarters, insurance building, hospital, home, etc. The central computer 52 can serve as a repository for all the information captured by one or more DAR systems 12.

In one example, when vehicle 42 parks in a garage or parking lot at headquarters 56, the base station 44 may automatically download any information previously received from DAR systems 12. All content for each DAR system 12 may have an associated identifier. For example, an employee number of operator 14, a report identification number, date and time stamp, etc. The information 40 received by central computer 52 may then be stored and indexed according to this associated identifier. This same indexing may also happen in the base station 44 and in the DD device 26.

The central computer 52 can also offer information back to the operator 14 in near real time. For example, the face of malfeasance 36 may be captured by the acquisition circuitry 13 along with audio information identifying a name, drivers license, social security number, etc. The DD device 26 can then relay the captured facial image and audio information to base station 44 for relaying back to the central computer 52. The central computer 52 may then conduct a background check to confirm the identify and criminal record of suspect 36 by comparing the face in the received video data 40 with drivers license photos, correctional institution photos, etc. that may be contained in a central computer database.

Acquisition Circuitry

Figure 4:
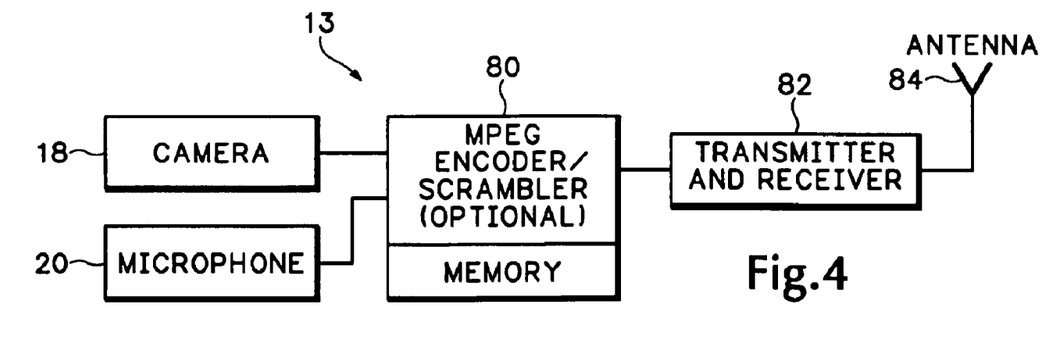
FIG. 4 is a block diagram of acquisition circuitry used in the DAR system.

FIG. 4 shows the acquisition circuitry 13 in more detail. The camera 18 and microphone 20 are each optionally coupled to a transmitter/receiver (transceiver) 82 through an MPEG encoder 80. The encoder 80 may also have scrambling circuitry to thwart unauthorized reception/users. The transceiver is connected to an antenna 84. The software and hardware in optional MPEG encoder 80 is an industry-standard video/audio compression system that compresses the audio and video data captured by camera 18 and microphone 20, respectively. The choice of which MPEG standard to use is determined by requirements of the operator 14 and the particular application. Optionally, block 80 can include memory to record the video and audio, if it is desired to have redundant storage of the data.

Some DAR systems 12 may have the MPEG data compression occur in the DD device 26. An uncompressed data stream from acquisition circuitry 13 may take longer to wirelessly transmit to the DD device 26. However, there may be more flexibility in choosing what degree and kind of compression to use when the compression is performed in DD device 26.

The transceiver 82 receives and transmits video and audio data and in addition senses which frequency to utilize when there are potential interfering signals. In one implementation, the transceiver operates according to IEEE Standard 802.11b. The presently favored band is 2.4 Megahertz, since that is one of the standard bands for this class of use, and has reduced interference problems. The audio and/or video signals are transmitted and received through a built-in antenna 84. Other types of wireless communication systems can alternatively be used that include Infra-Red (IR), Radio Frequency (RF), ultrasound, etc.

Data Display and Report Submission (DD)

Figure 5:
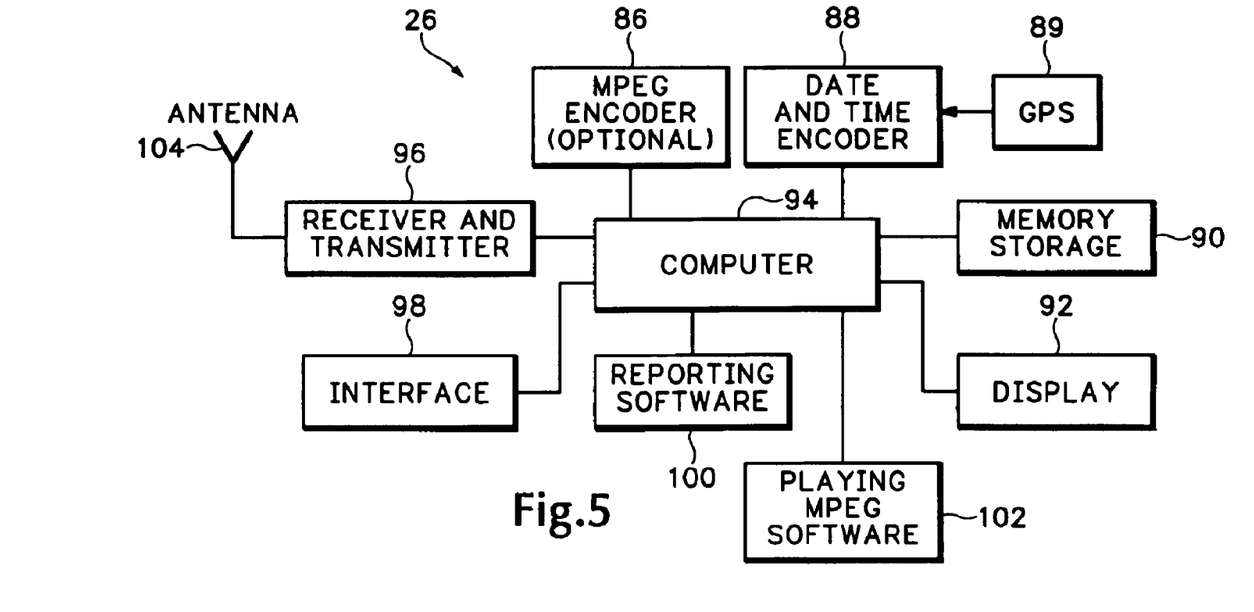
FIG. 5 shows a block diagram of a data display and report submission (DD) device used in the DAR system.

FIG. 5 shows the DD device 26 in more detail. In one implementation, the DD device 26 is a slightly customized Personal Digital Assistant (PDA) or a Pocket PC. However, any type of miniature computing device can be used. A built-in antenna 104 is coupled to a transceiver 96. The antenna 104 and transceiver 96 are compatible with the antenna 84 and transceiver 82 in the acquisition circuitry 13 and in one embodiment also implement the IEEE Standard 802.11b protocol.

The DD device 26 wirelessly receives data from the acquisition circuitry 13 via transceiver 96. The data is passed to the computer 94 for processing. Depending on whether the received data is compressed or not compressed prior to reception, the DD device 26 commands further compression, no compression, or first-time compression, depending on the needs of the operator 14. The computer 94 then performs different operations required to prepare the data for storage and possibly retransmission or downloading to the base station 44 or central computer 52 shown in FIG. 3. An MPEG encoder 86 may be used by the computer 94 to encode the data received from acquisition circuitry 13, if not already encoded by acquisition circuitry 13.

Date and time encoding operation 88 includes a clock that supplies the computer 94 with a date/time stamp that can be attached to the data received from the acquisition circuitry 13. Date and time encoding 88 may or may not be provided, and in addition, a special authentication key may be added to the video and audio data by encoder 88 which is described in more detail below.

An interface 98 allows the operator to choose the mode of operation, including the choices of when and what kind of video/audio recording, how to enter reports, and how to access previously recorded data. Depending upon operator needs, the interface 98 may be a keyboard or a touch-sensitive screen.

The memory storage 16 can be any one of a number of commercially available memory system that may include Flash memory, memory sticks, or other means to provide convenient non-volatile storage of data. In one embodiment, the memory storage device 90 is removable from the DD device 26. This allows the operator 14 to capture one set of events, replace the memory storage device 90 in a repository, and insert a new memory storage device 90 to capture another set of events. The operator 14 may also carry spare memory devices 90 in case a long recorded event fills the capacity of one memory storage device 90.

The display 92 allows the operator 18 to monitor what is being recorded in real time or later play back events previously stored in the memory storage 90. The MPEG software 102 allows the computer 94 to decode the MPEG data stream for outputting to display 92. The display 92 can also be used for receiving video or other text information back from the central computer 52 or back from the base station 44 (FIG. 3). For example, the central computer 52 may send back the results of a background search based on information previous transmitted to the central computer 52 from the DD device 26.

Reporting software 100 is customized to the needs of the operator. For example, there may be a particular format that is required for reports filed in a police department, insurance company, hospital, etc. A pre-stored form can be selected and displayed and then filled out by the operator 14.

Figure 6:
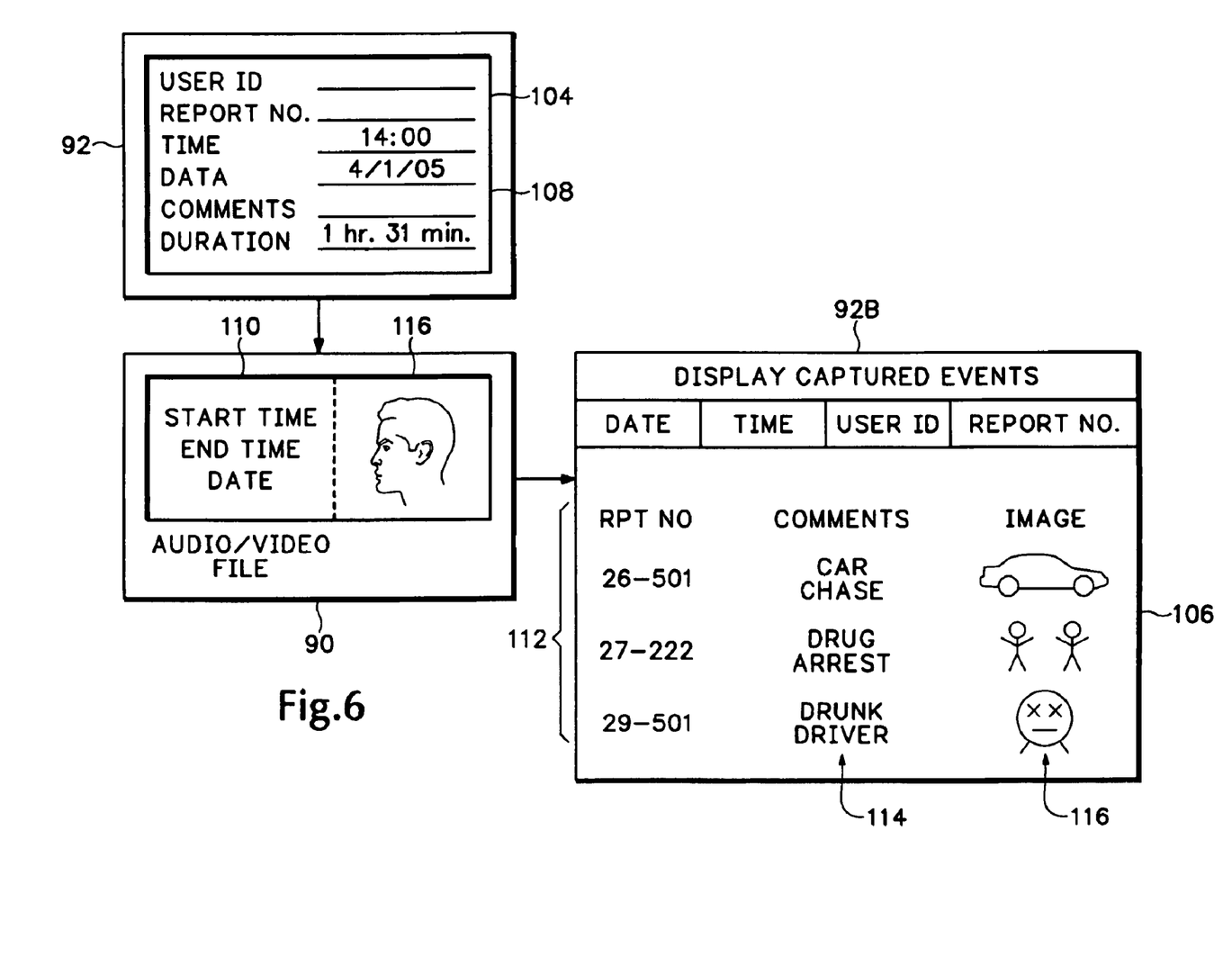
FIG. 6 shows a report form attached to a media file in the DD device.

Referring to FIG. 6, a first screen 104 on display 92 may pop up whenever audio or video events have been captured. The first screen 104 shows a form 108 that has fields for identifying a user ID, report number, time, date, comments and a video or audio duration. The time, date and duration fields may automatically be filled in by the data and time encoder 88 in FIG. 5 and might not be available for modifying by the operator. The computer 94 links the media file 110 generated from the audio and video data received from the acquisition circuitry 13 with the report form 108 provided by reporting software 100 (FIG. 5). For example, the computer 94 attaches a form 108 to every new media file 110 received from the acquisition circuitry 13. The audio and video data 110 is then indexed by computer 94 using the attached report 108.

For example, the operator 14 may request via interface 98 (FIG. 5) a list of all media files captured and saved in memory 90. The computer 94 displays a screen 106 listing all of the stored media files 112. The media files 112 may be listed according to any of the fields in associated forms 108. For example, according to report number. The media files listed in screen 106 can also display comments 114 added by operator 14 or display a sample image 116 extracted from the media file 110 to further assist the operator 14 in locating the desired recorded events.

If portions of the displayed form 108 are not filled in, the operator 14 may be prevented from downloading the associated media file 110 to the central computer 52 at headquarters 56 (FIG. 3). For example, every file 110 may require the operator 14 to enter at least a report number. Correspondingly, the central computer 52 may use the report number, user ID number, date, time, etc. contained in the form 108 to electronically file the media data 110 received from base station 44 or from DD device 26.

The media files 110 and any associated reports 108 are generated and stored in an acceptable format used in the operator's job. For example, in police applications, report 108 may first prompt the operator 18 to enter certain information associated with a police investigation. For example, case number, suspect name, driver's license, etc. The media files 110 that are associated with the computer generated report 108 may also be automatically named, for example, with a case number and stored in the same directory as the police report. Alternative software programs 100 can be provided for other operator applications. For example, other automated report generation software 100 may be customized for insurance adjusters or medical applications.

Authentication

Another software program operated by computer 94 (FIG. 5) can self authenticate the media files 110 that are stored in memory 90. For example, a digital identification tag may be automatically inserted into the media data 110 by the MPEG encoder 80 in acquisition circuitry 13 or by the computer 94 in DD device 26 to authenticate the media file 110 is actually generated by the DAR system 12. A device specific digital identification tag may also include the time and date generated by data and time encoder 88.

The audio or video signal captured in acquisition circuit 13 can be stored on multiple channels. Alternately, one of these channels can be used to insert a series of markers into the media file 110 authenticating the recorded events were originally recorded in the DAR system 12. Similarly, the time and date generated by the data and time encoder 88 may be recorded directly onto the video to verify the time of the recorded event. To ensure that the time and date encoder 88 in the DD device 26 is not tampered with, an internal password may be required to be entered via interface 98 in order to modify the clock settings provided by data and time encoder 88.

In another application, a Global Positioning System (GPS) receiver 89 may be located in the DD device 26 that periodically updates the data and time encoder 88 and may also obtain geographical location from a GPS satellite. The GPS date, time, and/or location information can then be inserted into the audio data for authentication of the captured images. The DD device 26 may also optionally automatically activate display 92's loudspeaker and generate an audio prompt that asks the operator to confirm a time and date. The operators voice is then recorded and stored on the media file 110. This audio prompt can come on periodically or can automatically prompt the operator for the time and date each time the batteries in the DD device 26 are replaced or when the data in the DD device 26 is downloaded.

In another authentication process, the audio and video data captured by the authentication circuitry 13 may be wirelessly relayed to the vehicle 42 shown in FIG. 3. The date and time stamp generated by encoder 88 may be attached on to the media file 110 by the DD device 26. The base station 44 or central computer 52 may then add another date and time stamp onto the same data 110 for further authentication.

In yet another authentication technique, a docking station may be provided at head quarters 56 or in the vehicle 42 that is used to recharge batteries in the DD device 26 and/or download the media files 110 from memory storage 90. The docketing system can also be used to verify any clock settings in the data and time encoder 88 in the DD device 26.

Figure 7:
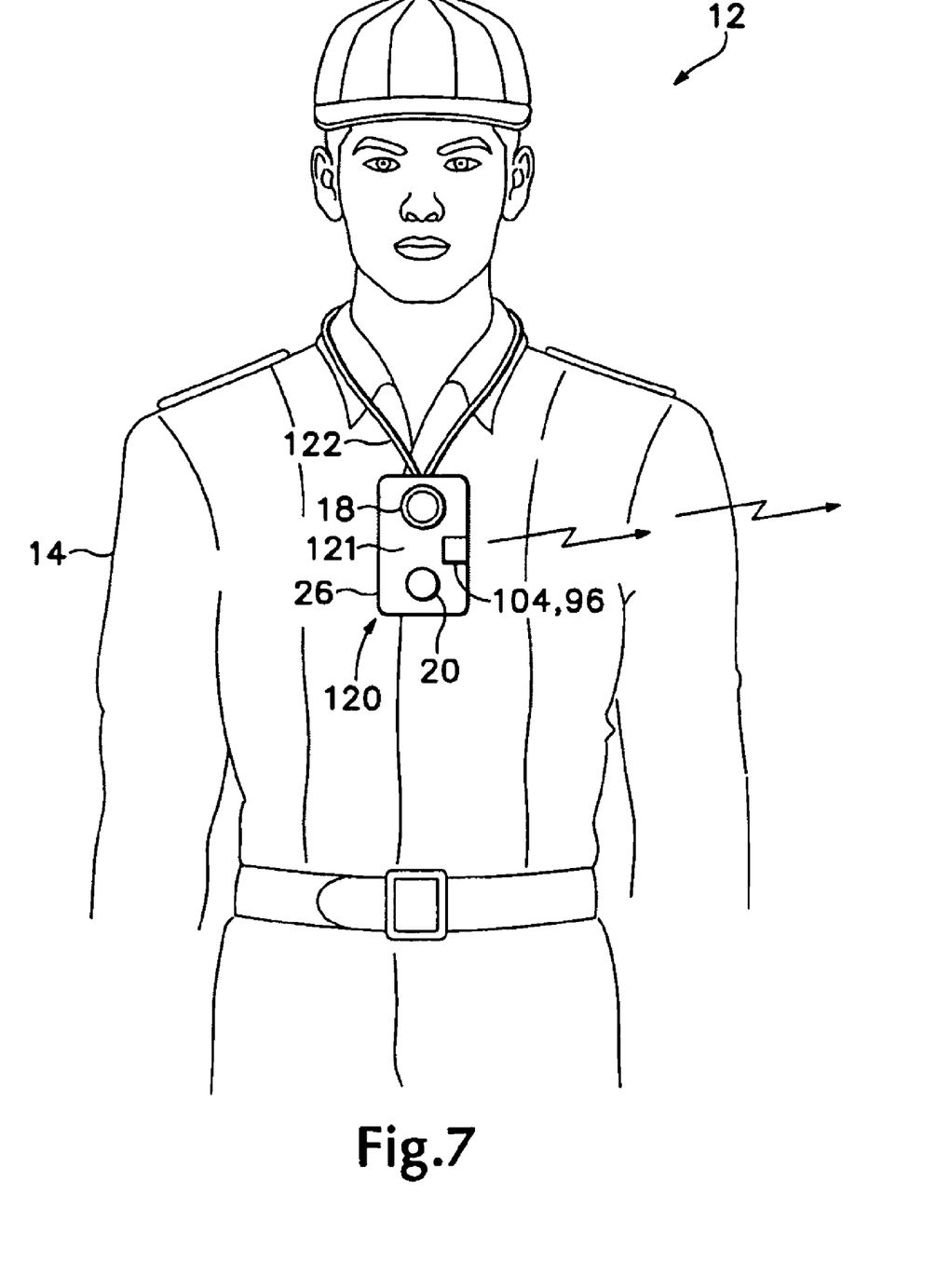
FIG. 7 shows an alternative embodiment of the DAR system that incorporates the camera and microphone into a Personal Digital Assistant (PDA).

FIG. 7 shows an alternative embodiment of an integrated DAR system 120 where a microphone 20 and video camera 18 are integrated together with the data display and report submission (DD) device 26. In this example, the integrated DAR system 126 may be a Personal Digital Assistant (PDA). In this embodiment, all the same functions described above in FIGS. 1-6 for the DAR system 12 are still performed. However, the acquisition circuitry 13 previously described in FIGS. 1-4 is now integrated into and with the DD device 26.

The miniaturized video camera 18 and the miniaturized microphone 20 both extend from the front of the PDA 121. The integrated DAR system 120 is carried on a strap 122 that wraps around the neck of operator 14. Alternatively, the PDA 121 operating the integrated DAR system 120 may be carried in the hand of the operator 14 or in a pocket of the operator that has a plastic see-through front face. In this embodiment, the pocket may also include small holes that promote sound waves to be detected by microphone 20.

The integrated DAR system 120 includes the same receiver and transmitter 96 and antenna 104 that allow wireless communication to a base station 44 (FIG. 3) or to a central computer 52. The video and audio signals captured by the integrated DAR system 120 can also be encrypted for storage and wireless encrypted transmission 40 (FIG. 3) to the base station 44 or central computer 52 as also described above. The integrated DAR system 120 also provides the same authentication operations described in FIGS. 1-6. Integrating the video camera 18 and microphone 20 with the DD device 26 prevents having to wireless transmit video and audio signals from the video camera 18 and microphone 20 to the DD device 26.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles.

The invention claimed is:

1. A wireless data acquisition and recording (DAR) system, comprising:
   acquisition circuitry including a video camera carried by an operator for capturing video events associated with the operator;
   a data display and report submission (DD) device for receiving the video events captured by the acquisition circuitry, storing the captured video events as digital media files, authenticating that the digital media files were generated by the DAR system, attaching electronic reports to the stored digital media files for the different captured video events, displaying the electronic reports, requiring the operator to fill in entries in the electronic reports before allowing the associated digital media files to be transmitted from the DD device, and using the entries in the electronic reports to index associated digital data; and
   a transceiver for automatically relaying the media files and electronic reports from the DD device to a base station.

2. The wireless data acquisition and recording (DAR) system according to claim 1 wherein the base station is configured to automatically relay the media files to a central computer.

3. The DAR system according to claim 1 wherein the DD device includes:
   receiver circuitry for wirelessly receiving digital information back from the base station or a central computer in response to previously transmitted media files; and
   a display for displaying the digital data wirelessly received from the acquisition circuitry or the digital information wirelessly received back from the central computer or the base station.

4. The DAR system according to claim 1 wherein the acquisition circuitry and the DD device are both integrated into a same Personal Digital Assistant (PDA).

5. The DAR system according to claim 1 wherein the electronic reports include investigation reports that indexes the media files with different files.

6. The DAR system according to claim 1 wherein the DD device includes a date and time encoder for attaching a date and time stamp to the different media files captured and transmitted by the acquisition circuitry.

7. The DAR system according to claim 6 wherein the base station that also attaches a date and time stamp to the media files received from the DD device.

8. The DAR system according to claim 1 wherein the DD device is configured to authenticate that the media files were generated by the DAR system by inserting a series of markers into a channel of the digital media files.

9. The DAR system according to claim 1 wherein the acquisition circuitry or DD device includes an encoder/decoder for encoding or decoding the video signals for the captured events.

10. The DAR system according to claim 1 wherein the acquisition circuitry is located on the front face of the DD device.

11. A method for recording and storing events, comprising:
    capturing images of events with a camera located on an operator and converting the captured images into digital data;
    storing the digital data for the captured images as media files in a wireless portable storage device;
    authenticating that the digital data in the media files were generated by the camera;
    attaching electronic reports to the stored media files for the different captured images;
    displaying the electronic reports on the portable storage device;
    requiring the operator to fill in entries in the electronic reports before allowing the associated digital data to be transmitted to a central computer;
    transmitting the reports and the associated digital data to a central computer; and
    using the entries in the reports to index associated digital data in the central computer and in the portable storage device.

12. The method according to claim 11 including compressing the digital data received from the camera and transmitting the compressed data to a base station.

13. The method according to claim 11 including using a short range IEEE 802.11 wireless communication system for transmitting the digital data from the portable storage device or to a base station and using a long range radio or cellular communication system for transmitting the digital data from the base station to the central computer.

14. The method according to claim 11 including:
    automatically downloading media files from the portable storage device to a base station located in a vehicle whenever the portable storage device comes within communication range of the base station; and
    relaying the media files from the base station to the central computer.

15. The method according to claim 14 including receiving information at the base station back from the central computer in response to the relayed media files and then forwarding the received information to the portable storage device.

16. The method according to claim 15 including:
capturing a video image with the camera;
capturing audio signals identifying the video image;
transmitting the captured video image and captured audio signals from the portable storage device to the central computer;
using the captured video image or captured audio signals to search a data base in the central computer; and
transmitting results of the search to the portable storage device.

17. The method according to claim 11 including attaching a time and date stamp to the media files identifying when the images were captured and restricting access to controls for adjusting a timer that generates the time and date stamp.

18. The method according to claim 17 including automatically updating the timer and location from a global positioning system.

19. A method for recording and storing events, comprising:
capturing images of events with a camera located on an operator and converting the captured images into digital data;
storing the digital data for the captured images as media files in a wireless portable storage device;
authenticating that the digital data in the media files were generated by the camera;
attaching electronic reports to the stored media files for the different captured images;
attaching a time and date stamp to the media files identifying when the images were captured; and
restricting access to controls for adjusting a timer that generates the time and date stamp.

20. The method according to claim 19 including automatically updating the timer and location from a global positioning system.

* * * * *